United States Patent

Andreae

[15] 3,651,516

[45] Mar. 21, 1972

[54] CODE CONVERTER

[72] Inventor: John Hugh Andreae, London, England

[73] Assignee: Standard Telephones and Cables Limited, London, England

[22] Filed: Mar. 2, 1970

[21] Appl. No.: 15,423

[30] Foreign Application Priority Data

Mar. 7, 1969 Great Britain ....................12,223/69

[52] U.S. Cl. ....................340/347 DD

[51] Int. Cl. ....................H041 3/00

[58] Field of Search ....................340/347 DO

[56] References Cited

UNITED STATES PATENTS 3,396,382 8/1968 Jones....................340/347

3,310,780 3/1967 Gilley....................340/347

3,398,239 8/1968 Rabow....................340/347

3,509,327 4/1970 Larson....................340/347

*Primary Examiner*—Daryl W. Cook

*Assistant Examiner*—Jeremiah Glassman

*Attorney*—C. Cornell Remsen, Jr., Walter J. Baum, Percy P. Lantzy, J. Warren Whitesel, Delbert P. Warner and James B. Raden

[57] ABSTRACT

This invention relates to a code converter which converts a variable length serial code (such as a code of the Morse Code type) into a fixed length parallel code. It temporarily stores a representation of each input code group in a shift register provided with a "dummy 1" which is shifted along the register in front of any received code group so as to indicate its length. The code converter forms part of a selector which can be attached to an electrically operated typewriter to enable it to be controlled by dictation using a form of code similar to Morse Code.

5 Claims, 25 Drawing Figures

Figure 1:
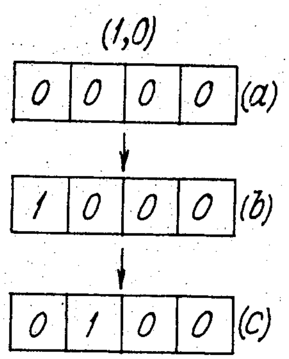

*Inventor*
J. H. Andreae-9
By [signature]
*Attorney*

CODE CONVERTER

This invention relates to code converters, and in particular to converters which convert a variable length code group serial code input into a fixed length parallel binary code output.

Codes employing fixed length code groups have the advantage over those employing variable length code groups that, for a steady transmission rate of coded information, the rate of coding is constant. Such types of code are commonly employed in applications, such as teleprinting, where the encoding and decoding are effected by machine because the regularity of input and output is mechanically convenient in such instances and outweighs any disadvantage arising from the fact that such a code makes less efficient use of the code elements than can be made with a code employing variable length code groups. The importance of these considerations is generally reversed however when encoding or decoding is to be effected without the aid of a machine, for under these circumstances the rate of coding or decoding is likely to be limited by human performance, hence there is an advantage to be gained from using codes employing variable length code groups on account of their greater coding efficiency.

The principal problem of code conversion of a variable length serial code into a fixed length parallel binary code is one of conversion efficiency. The problem can be illustrated by reference to the conversion of Morse code. This code being composed of short and long pulses might be thought of as a binary code, but in fact is a quaternary code, having in addition to the short and long pulses, a short pause, indicating the end of a code group, and a longer pause, indicating the end of a word, or in other words indicating a space. The code can be simply modified so that, instead of the longer pause, a special code group is allocated to represent a space, and then the code becomes a ternary code; the three types of code element being a short pulse followed by a short interval, a long pulse followed by a short interval, and a long interval. It would be possible to make a straightforward code converter which converted the serial ternary code into a parallel ternary code having as many parallel outputs as the maximum number of code elements forming a single code group of the serial code. However this would be an efficient form of code conversion because, in common with all variable length codes this particular serial code has the restriction imposed upon it that one of its types of code element, the cope group termination indicator, must occur once, and only once, in each code group.

One method of code conversation which is more efficient relates to a code converter constructed so that those types of code element of the serial code other than the code group termination indicator are written into a binary shift register and also counted in a binary counter, and so that the receipt of a code group termination indicator causes the read out of the contents of both the shift register and counter. In the present invention the binary counter is dispensed with and the binary shift register is provided with a dummy 1 to precede any code group stored therein.

According to the invention there is provided a code converter constructed to produce a fixed length parallel binary code output in response to the input of variable length code groups, the variable length code group being composed of a sequence of code elements terminated by a code group termination indicator, which code converter includes a shift register and is constructed so that upon receipt of a code element of a type other than the code group termination indicator a shift pulse is applied to the shift register to shift its contents by one stage and a representation of that type of element is written into the first stage and so that upon receipt of a code group termination indicator a fixed length parallel binary code group indicative of the states of the binary elements of the shift register is output and then a one is written into the first stage of the shift register while the remaining stages are cleared.

Figure 2:
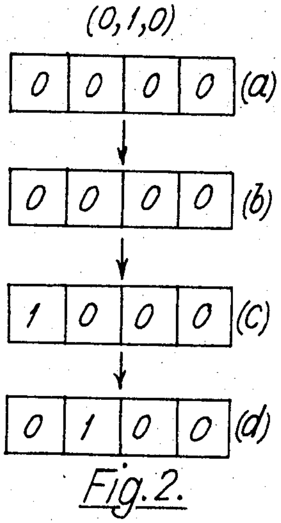
Figure 3:
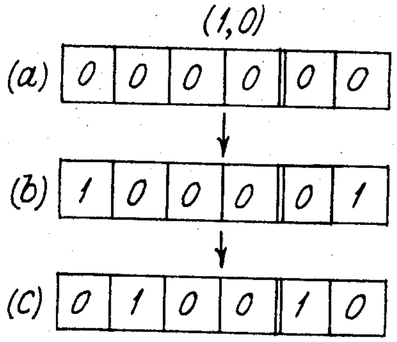
Figure 4:
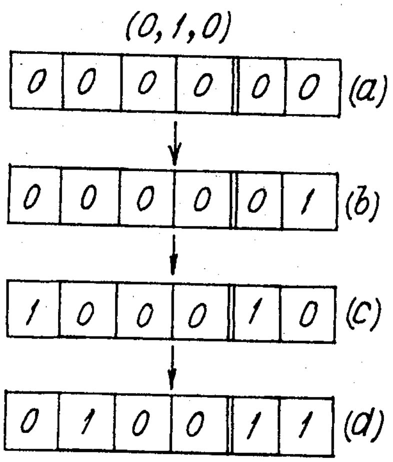
Figure 6:
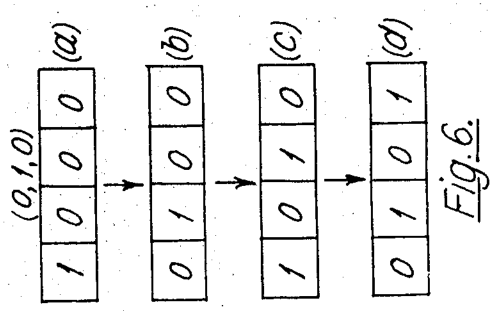
Figure 5:
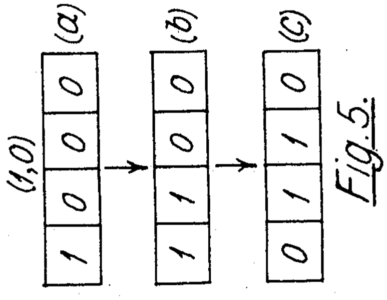

It will be apparent that the elements of a serial code having only two types of code element can be written into a shift register as they are received where they will give an unambiguous record. However the recording in this manner of the receipt of a variable length code having in addition to the two types of code element a further code element, namely code group termination indicator, leads to ambiguity unless there are particular restrictions imposed upon the possible code groups forming the variable length code. This is illustrated with reference to the diagrams of, FIGS. 1 and 2 which respectively represent the states of a first and a second four bit binary shift register during the receipt by the first shift register of the code group (1,0) and by the second shift register of the code group (0,1,0). FIGS. 1*a* and 2*a* show the shift registers after they have been cleared and before the receipt of their first code elements. The receipt of the first code element a '1' in the case of the first shift register, and a '0' in the case of the second, causes the shift registers to assume the states illustrated respectively at FIGS. 1*b* and 2*b*. FIGS. 1*c* 2*c* illustrate their states after receipt of their respective second code elements, which in the case of the first shift register in the final code element of the group other than the code group termination indicator which serves to halt that shift register. FIG. 2*d* illustrates the state of the second shift register upon the receipt of its final code element other than the code group termination indicator. These figures show that the final states of the shift register are identical although they have received different code groups. In the specification accompanying our earlier patent application referred to above a method of resolving this problem of ambiguity was disclosed in which use is made of a binary counter in addition to the shift register. FIGS. 3 and 4 show how the ambiguity existing in FIGS. 1 and 2 is resolved by means of a binary counter. FIGS. 3*a–c* comprises a diagram showing the transitions of the states of a combination of shift register and binary counter when receiving the code group (1,0), and FIGS. 4*a–d* show the corresponding states during the receipt of the code group (0,1,0). In these Figures the four elements on the left represent the shift register and the two elements on the right represent the binary counter.

The ambiguity arising from the sole use of the shift register occurs because any '0's received before the first '1' of any serial code group are not significant in as much as they do not alter the state of the shift register. This problem of ambiguity can be resolved by restricting the choice of code groups to those code groups starting with a '1', but this means that longer code groups will be required as the first element is not significant because it is the same for all code groups. An alternative approach is to provide the shift register with a dummy '1' to precede any code group that is written into it.

FIGS. 5*a–c* and 6*a–d* are diagrams of the two shift registers when they are provided with dummy '1's. FIG. 5 shows the transitions occuring upon receipt of the code group (10), and FIGS. 6 the transitions occuring upon receipt of the code group (010).

A code converter constructed according to this invention may be used in conjunction with some form of decoding matrix to form a selector responsive to a variable length serial code. The different types of code element forming this serial code may be generated by the operator on separate channels, for instance the operator could be provided with a separate key for each type of code element. Alternatively the operator could generate more than one type of code element on an input channel, in which case the selector will have to include a code element type discriminator.

Figure 8:
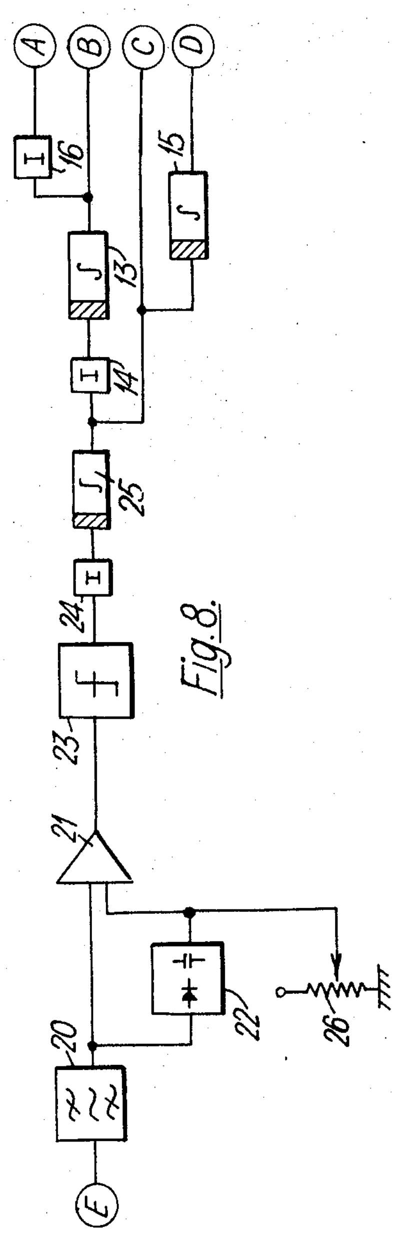
Figure 7:
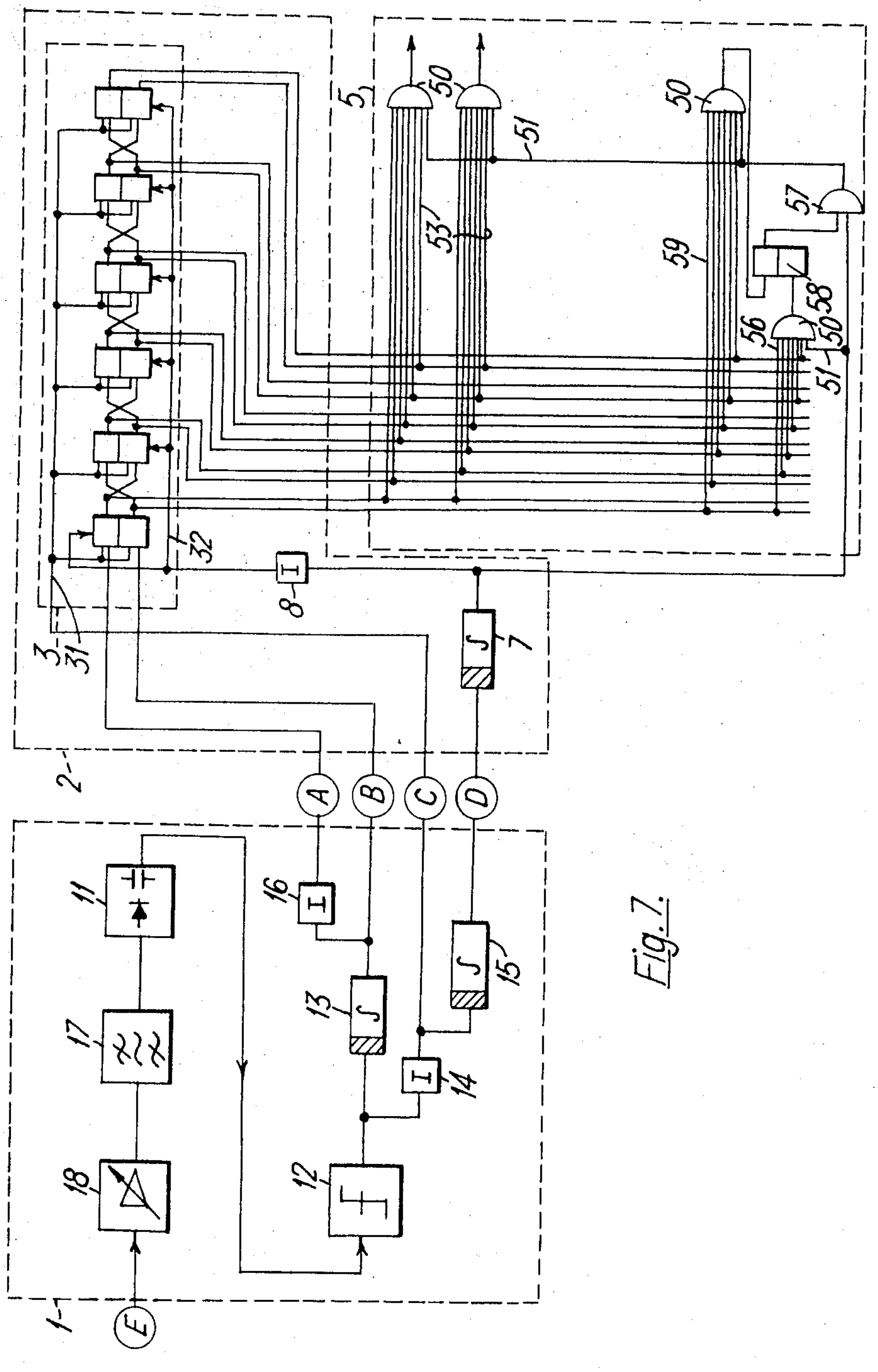
Figure 9A:
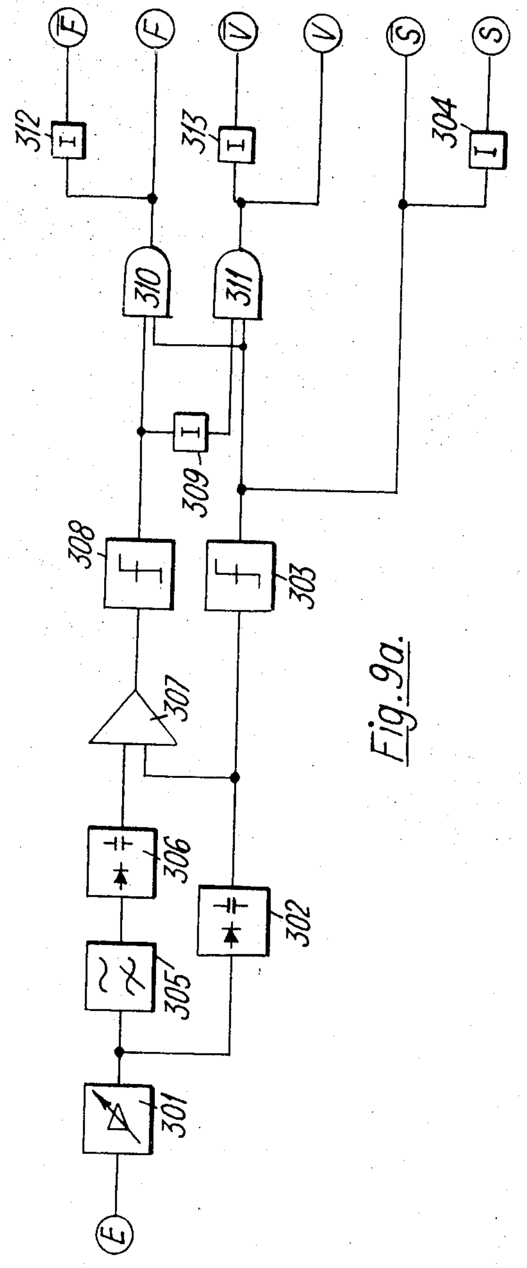
Figure 9B:
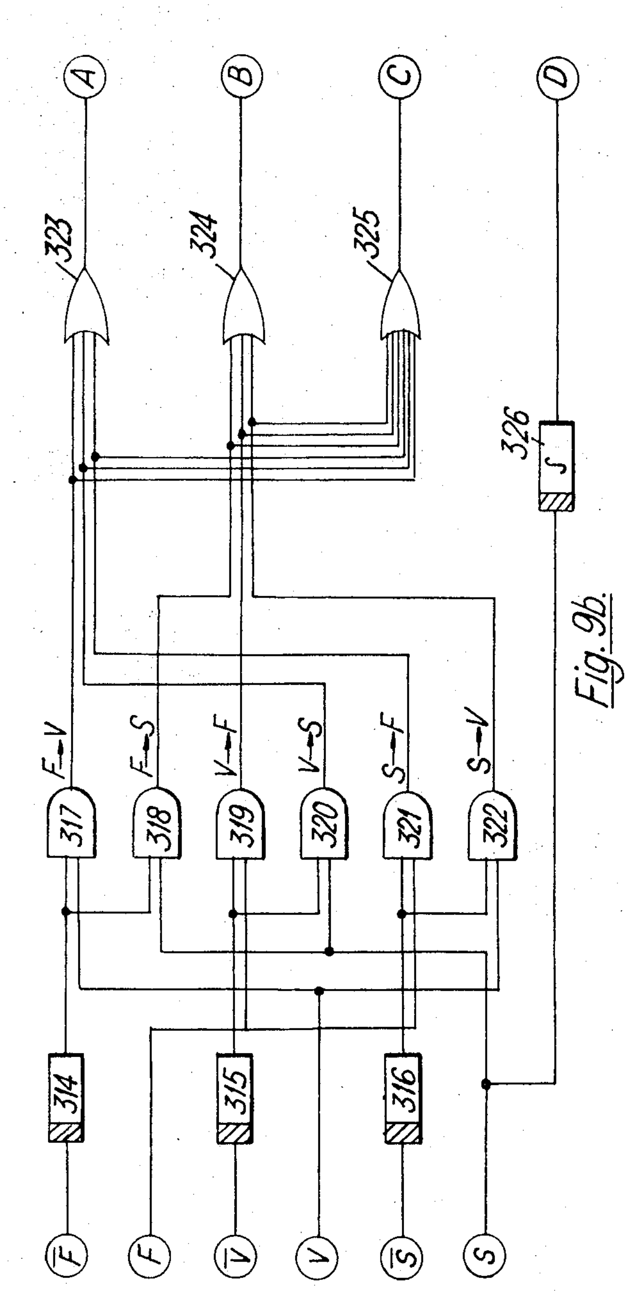

The use of such a discriminator together with the code converter permits the construction of a voice operated selector responsive to variable length code groups, and the foregoing and other features of the invention will become more apparent and the invention itself will be best understood by reference to the following description of a conversion unit which can be attached to an electrically operated typewriter to convert it to a voice operated typewriter. This unit includes a serial to parallel code converter embodying the invention in its preferred form and is described with reference to FIGS. 7, 8 and 9*a* and 9*b* of the accompanying drawings in which:

FIG. 7 is a diagram of a typewriter conversion unit comprising code element discriminator, code converter and parallel code decoder, FIG. 8 is a diagram of an alternative code element discriminator, and FIGS. 9*a* and 9*b* together form a diagram of a further alternative form of code element discriminator for use with a different type of code.

It has been indicated above that a variable length serial code group must be composed of a sequence of code elements of different type terminating with a code group termination indicator. Since, in the utterance of code groups, an operator will almost inevitably want to pause between code groups it is convenient to make the code group termination indicator a pause, the pause being defined as an interval exceeding a certain minimum duration in which the input amplitude is beneath a certain threshold. This conversion unit employs a code like Morse code having two other code types apart from the code group termination indicator; these are a short burst of sound followed by a short interval of silence, and a longer burst of sound followed by a short interval of silence. The operator can conveniently utter these two other types of code element by means of the velar stop /*d*/ followed either by a short or by a long vowel to form respectively /*di*/ or /*dar*/.

Referring to FIG. 7 of the drawings, the conversion unit consists of a discriminator, indicated generally at 1, having four outputs A, B, C and D connected to a code converter indicated generally at 2. The code converter consists principally of a shift register 3 formed by the interconnection of six bistables. The six bistables are connected to a parallel code decoding matrix indicated generally at 5. The input to the discriminator 1 is at E, and is from a microphone.

The discriminator 1 is required to distinguish short and long bursts of sound and short and long intervals of silence. The time threshold for distinguishing short from long bursts of sound is typically approximately 150 m.sec; that for distributing short from long intervals of silence is preferably one which is capable of being set to suit the skill of the operator because someone relatively unfamiliar with the apparatus and the code may require a threshold of approximately 500 m.sec., whereas a more skilled operator would be able to achieve a more rapid output of information by reducing this threshold to the neighborhood of 200 m.sec. or less. The time threshold discrimination is achieved with logic devices, which for the purposes of this specification will be termed 'integrating monostables', whose logic properties are defined by the following relationships:

1. The output is 0 whenever the input is 0
2. If the input rises to 1 the output remains at 0 until the input has been continuously 1 for a period exceeding a time '*t*' whereupon the output rises to 1 for as long as the input remains at 1.

A practical realization of an integrating monostable is given by a capacitor shunted by a switch, the capacitor being connected across the input terminals of a voltage threshold device, such as a Schmitt trigger, and charged from a constant current source.

In its simplest form the discriminator 1 is as represented in FIG. 7 and consists of an envelope detector 11 followed by an amplitude threshold detector 12 whose output corresponds to the detection of sound. The output of the threshold detector 12 is fed to an integrating monostable 13 and is also fed to an inverting stage 14 which provides an output corresponding to silence fed directly to the output terminal C and also to an integrating monostable 15. The output from the integrating monostable 13 is fed directly to the output terminal B, and also via an inverting stage 16 to the output terminal A. The output from the integrating monostable 15 is connected directly to the output terminal D. The envelope detector 11 is optionally preceded by a band pass filter 17 and an automatic gain control 18.

An output at D signifies that a long interval of silence, the group termination indicator, has been received, and this is employed by the code converter and matrix decoder to give an output from the decoding matrix representative of the states of the bistables of the shift register 3. An output at B signifies that a long burst of silence is being received, and one at A signifies the inverse of this. These two outputs are connected to the first bistable of the shift register 3. The states of A and B are written into the shift register by a 0 to 1 transition appearing on a shift line 31 which also causes the state of each bistable of the shift register to be transferred to the next bistable. This shift line is connected to the output C of the discriminator so that a shift pulse is generated each time a code element other than the code group termination indicator is received. This pulse appears at the onset of each interval of silence, but it should be remembered that the onset of silence has another effect, that of causing the output of the integrating monostable 13 to revert to zero if it is not already zero. Therefore the recovery time of the integrating monostable 13 is arranged to be greater than the time taken to alter the shift register so that if there was an output at B immediately preceding the onset of silence then it is this output that is written into the first stage of the shift register by the shift pulse, and not the output from A. All but the first stage of the shift register 3 is cleared by means of a 0 to 1 transition appearing on a reset line 32, which also has the effect of setting a 1 into the first stage.

The contents of the six bistables forming the shift register form a six bit parallel code which is decoded by the matrix decoder 5. The matrix decoder has a number of rows, two of which are shown by way of example at 53. The rows are interconnected with the six pairs of columns, and each row is terminated by an output AND gate 50 and corresponds to a separate output of the selector. A pair of columns is associated with each of the six bistables and the two members of each pair are connected to the two outputs of its associated bistable. Each AND gate 50 has seven inputs, one of these inputs is from readout line 51 and the remaining six are connected one to one member of each pair of columns. The resulting interconnection of rows and columns is such that an output AND gate 50 is only opened by a pulse appearing on its readout line 51 if the appropriate code group is stored in the six bistables.

The combination of code converter and matrix decoder is constructed to give an output after the receipt of a code group termination indicator which is itself indicated by an output at D. For this purpose the output at D is connected to a monostable 7 which will give one pulse of predetermined duration upon receipt of each code group termination indicator. The leading edge of this pulse provides a readout pulse for the matrix decoder, and then the trailing edge is used to clear the shift register (except for its first stage which is set to 1) by means of the connection between the reset line 32 and the monostable 7 via an inverting stage 8. In circumstances where the code converters is not used in combination with the matrix decoder, the monostable 7 and the inverting stage 8 would be retained as part of the code converter, so that the leading edge of a pulse from D could be used to initiate the read out of the code stored in the bistables, and the trailing edge be used as before to clear them.

The output from the monostable 7 may be applied directly to all the AND gates 50, but under these circumstances when the machine is switched on it is live to any background sound picked up by the microphone, thereby giving rise to the possibility of random sounds being interpreted by the machine as one of the shorter code groups. To overcome this difficulty the decoder can be constructed so that when the machine is switched on it can be switched between a quiescent state and an active state by means of two particular code groups. For this purpose there is a direct connection between the monostable 7 and the readout line 51 of the row 56, which is the row corresponding to the code group which switches the machine into its active state. In contrast to this the monostable 7 is not directly connected to all the remaining readout lines 51, but is connected to them via a two input AND gate 57. The second input to this AND gate 57 is derived from the output of a bistable 58. The bistable 58 is switched by the output from the row 56, corresponding to the code group which switches the machine into its active state, and by the output from a row 59, which corresponds to the code group which switches the machine into its quiescent state. Therefore when the machine is in its quiescent state a pulse from the monostable 53 is blocked from the readout lines 57 of all the rows of the matrix decoder except row 56. The code group corresponding to row 56 however will switch the machine into its active state in which it is able to respond to the code groups corresponding to all the other rows including that of row 59 be which the machine may be switched back into its quiescent state. The code group associated with row 56 is specially chosen as a long group so as to be most unlikely to occur by chance in normal speech.

The choice of the number of cells forming the shift register must be determined with regard to the task for which the selector is employed. The foregoing description has related to a selector for an electrically operated typewriter, which typically may require approximately 50 separate inputs for all the characters and controls. The choice of a six cell shift register provides a six bit output parallel code permitting 64 separate outputs, therefore some of the extra codes can be used for purposes other than those directly associated with the use of the typewriter.

The envelope detector 11 of the discriminator 1 can be a simple rectifying and smoothing circuit, but with such a circuit a compromise has to be struck between designing it to have a sufficiently long time constant to smooth adequately the rectified waveform and yet to have a sufficiently short time constant for there to be a significant drop in the smoothed output when a interval of silence occurs. This compromise sets a lower limit to the smallest interval of silence that can be detected by the machine, and hence sets an upper limit to the rate at which code groups can be accepted by it. The circuit illustrated in FIG. 8 is designed to circumvent this problem, and may be substituted for the discriminator 1 shown in FIG. 7. This circuit consists of a fairly narrow band pass filter 20 connected to the microphone input at E. The output from the filter 20, which has a pass band of about one octave, is fed both directly to a differential amplifier 21, and also fed to the other input of this differential amplifier via a rectifying and smoothing circuit 22. The differential amplifier 21 is followed by a threshold detector 23, an inverting stage 24, and integrating monostable 25. The time constant of this integrating monostable 25 is chosen to be just greater than the period of the pass band frequency of the filter 20, and it will be shown later that its output is high during periods of silence and low during periods of sound. Since its output is the inverse of that from the threshold detector 12 of FIG. 7, the components following the integrating monostable 25 are the same as those following the threshold detector 12, with the exception that the inverting stage 14 is in a slightly different location to take account of the inversion. The differential amplifier 21 is also provided with a voltage biasing circuit depicted schematically at 26.

If the differential amplifier 21 and the rectifying and smoothing circuit 22 were dispensed with, and the output from the filter 20 connected directly to the threshold detector 23, the output from this threshold detector would be a series of pulses occurring every time the peak of the waveform exceeded the threshold. For all the time that the input signal were large enough, these pulses would have a repetition frequency equal to the pass band frequency of the filter 20. Since these pulses are fed to the inverting stage 24 the duration of the output pulses from this stage would inevitably be shorter than the time constant of the integrating monostable 25, and hence its output would be kept down. If however one or more of the waveform peaks from the filter were too small to exceed the threshold, it would give rise to an output pulse from the inverting stage 24 long enough to trigger the integrating monostable 25 into its high output state. This will happen immediately following the time the first missing pulse from the threshold detector should have occurred. Thus the output from the integrating monostable is seen to be high during periods of silence and low at other times.

It is seen therefore that the combination of filter, threshold detector, inverter and integrating monostable provides a circuit which is able to determine whenever the input waveform falls to a value beneath a certain threshold, even if it does this for no more than one cycle. The inclusion of the differential amplifier and the rectifying and smoothing circuit can now be seen to modify the whole circuit so as to provide it with a form of automatic gain control which allows the amplitude of the envelope of the input waveform to vary slowly without spuriously triggering the threshold detector 23, and the provision of the bias circuit 26 in effect turns off this AGC if the input waveform drops beneath a certain amplitude determined by the magnitude of the bias.

There are many alternative variable length serial codes which may be used with this invention apart from the Morse type code described above. An obvious alternative, and one which will only require a modification of the discriminator described with reference to FIG. 7, is a ternary serial code which has the same code group terminal indicator as described above, but whose other two types of code element are distinguished from each other otherwise than by their duration. It is also possible to use a code having more than three types of code element, though this may necessitate a modification of the shift register as well as of the discriminator. For example, if a quinary serial code were used, two cells for each stage of the shift register would be required so that each of the four types of code element other than the group termination indicator can be uniquely represented in a single stage. In certain circumstances a quaternary serial code can have sufficient inherent restrictions for it to be capable of being recoded without having more than one cell to each stage of the shift register. This occurs if the code group termination indicator is only distinguished from one of the other types of code element in that its duration exceeds a certain threshold. A discriminator for an example of this type of quaternary serial code is illustrated with reference to FIGS. 9*a* and 9 *b*.

The discriminator illustrated in FIG. 9*a* and 9*b* is one designed for a variable length serial code which may be considered as having as code elements fricative sound, voiced sound, and silence; the fourth type of code element, the code group termination indicator, being a period of silence exceeding a certain threshold. The first three of these code elements are defined so as to completely and exclusively define the input at any instant. Thus if the input does not exceed a certain amplitude threshold the input is classified as silence; if it does exceed the threshold it is necessarily classified as one of the two alternatives, fricative sound or voiced sound. Under these circumstances there is an inherent restriction in the code that consecutive code elements can not be of the same type. Hence there are only two possible transitions that can be made from any one code element to the next: fricative sound can only be followed by voicing or silence, voiced sound can only be followed by silence or friction, and silence can only be followed by friction or voicing. If the state preceding a transition is known a binary representation of the transition is capable of indicating unambiguously the state following the transition. Therefore, although the same binary representation is used in some instances to indicate one transition and in other instances to indicate one of two other transitions, any code group can be unambiguously described by binary representations of its sequence of transitions because a code group is necessarily preceded by and terminated with silence.

This code constructed from sound classes has previously been considered as composed of four code elements, fricative sound voiced sound, silence and a long period of silence indicating the end of a code group, but the binary representation of a code group is made according to the sequence of transitions between these classes of sound and not according to the classes themselves. Therefore the code elements forming this code can alternatively be considered to be seven in number: consisting of the six possible transitions, and a code group termination indicator consisting of a long period of silence.

The conversion unit illustrated in FIG. 7 is modified for use with this code constructed from sound classes by the replacement of the discriminator 1 of FIG. 7 with the discriminator of FIGS. 9*a* and 9*b*. For convenience of description this discriminator has been divided into two stages. In the first stage, illustrated in FIG. 9*a*, the input waveform is categorised as friction (F), voicing (V) or silence (S) and also as not-friction ($\bar{F}$), not voicing ($\bar{V}$) or not silence ($\bar{S}$); the second stage, illustrated in FIG. 9*b*, determines the transitions between the sound classes, and delivers the information at its outputs A B C and D in suitable form to be accepted by the code converter.

In FIG. 9*a* the input waveform from the microphone input E is fed to an automatic gain control 301, from which the signal is fed via an envelope detector 302 to a threshold detector 303. This threshold detector 303 measures the level of the total sound input, and therefore its output is fed directly to the terminal $\bar{S}$, and also via an inverting stage 304 to the terminal S. There is also a connection from the automatic gain control 301, through a high pass filter 305 having a cutoff frequency at approximately 1,000 Hz., to another envelop detector 306. A differential amplifier 307 compares the outputs of the two envelope detectors 302 and 306, and its output is connected to a threshold 308. The differential amplifier is seen to compare the total sound input with its high frequency component only. This is because friction is discriminated from voicing more by the absence of low frequency energy in the sound spectrum of friction, rather than by the presence of high frequency energy, as high frequency energy may also occur in voicing. Therefore an output from the threshold detector 308 is indicative of friction, and an output from an inverting stage 309 connected to this threshold detector 308 is indicative of voicing, provided that, in both cases, the input is sufficient to be categorized as 'not silence'. Hence these outputs are fed via AND gates 310 and 311 to terminals F and V respectively, and inverting stages 312 and 313 are included to provide for outputs at terminals $\bar{F}$ and $\bar{V}$.

Referring now to FIG. 9*b* three monostables 314, 315 and 316 are connected to the three terminals F V and S, and their outputs compared on AND gates 317 to 322 with outputs from terminals $\bar{F}$ $\bar{V}$ and $\bar{S}$. The monostables 314, 315 and 316, which are triggered by the rising edges of a pulse, are adapted to give output pulses at the end of the detection of a given feature. For example, monostable 314, being connected to terminal $\bar{F}$, will give an output pulse starting at the termination of the detection of friction. Suppose now that friction is followed by voicing, then the output from AND gate 317 rises for the duration of the output pulse of monostable 314. Therefore an output from AND gate 317 signifies the transition F → V, similarly outputs from AND gates 318 to 322 signify transitions F → S, V → F, V → S, S → F and S → V respectively. The outputs from these AND gates are connected to two OR gates 323 and 324 in such a way that the transition from any one state to one of the alternative states actuates one of the OR gates; but the transition to the other of the alternative states actuates the other OR gate. The outputs from these OR gates 323 and 324 are connected to the output terminals A and B respectively. A further OR gate 325 is connected to all the AND gates 317 to 322 so that any transition produces an output pulse at terminal C. The final connection, that between terminal S and output terminal D via an integrating monostable 326, is provided to give an output pulse an D when the code group termination indicator, a long interval of silence, is detected.

It is to be understood that the foregoing description of specific examples of this invention is made by way of example only and is not to be considered as a limitation on its scope.

I claim:

1. A code conversion apparatus constructed to produce a fixed length parallel binary code output in response to the input of variable length code groups, including a code element discriminator having a single input channel, means in said discriminator for distinguishing between a plurality of different types of code elements and for supplying same to a code converter input, the variable length code group being composed of a sequence of code elements terminated by a code group termination indicator, which code converter includes a multistage shift register and is constructed so that upon receipt of a code element of a type other than the code group termination indicator a shift pulse is applied to the shift register to shift its contents by one stage and a representation of that type of element is written into the first stage, and a parallel decoding matrix receptive of a code group termination indicator from said converter to produce a fixed length parallel binary code group indicative of the states of the binary elements of the shift register and then a one is written into the first stage of the shift register while the remaining stages are cleared.

2. The code conversion apparatus as claimed in claim 1 wherein the code element discriminator is adapted to be responsive to a vocally generated code.

3. The code conversion apparatus as claimed in claim 1 wherein the discriminator means is adapted to distinguish three code element types comprising a short signal followed by a short interval, a long signal followed by a short interval, and a long interval.

4. The code conversion apparatus as claimed in claim 2 wherein the discriminator is adapted to distinguish between three sound classes formed by fricative sound, voiced sound and silence. ,

5. A code conversion apparatus as claimed in claim 4, wherein said discriminator includes means capable of being switched by vocal command between two states quiescent and active, and means responsive to distinguish the quiescent state from the active state.

* * * * *